(12) United States Patent
Nitta

(10) Patent No.: US 9,833,922 B2
(45) Date of Patent: Dec. 5, 2017

(54) MOUNT FLANGE

(71) Applicant: DISCO CORPORATION, Tokyo (JP)

(72) Inventor: Shuji Nitta, Tokyo (JP)

(73) Assignee: Disco Corporation, Tokyo (JP)

( * ) Notice: Subject to any disclaimer, the term of this patent is extended or adjusted under 35 U.S.C. 154(b) by 28 days.

(21) Appl. No.: 14/993,420

(22) Filed: Jan. 12, 2016

(65) Prior Publication Data

US 2016/0207216 A1     Jul. 21, 2016

(30) Foreign Application Priority Data

Jan. 16, 2015   (JP) ................................ 2015-006441

(51) Int. Cl.
    *B26D 7/26*          (2006.01)
    *B28D 5/02*          (2006.01)
    *B23B 31/30*         (2006.01)

(52) U.S. Cl.
    CPC .......... *B26D 7/2621* (2013.01); *B23B 31/307* (2013.01); *B28D 5/022* (2013.01); *Y10T 279/11* (2015.01)

(58) Field of Classification Search
    CPC .... B23B 31/307; B26D 7/2621; B28D 5/022; Y10T 279/11
    See application file for complete search history.

(56) References Cited

U.S. PATENT DOCUMENTS

| | | | | |
|---|---|---|---|---|
| 1,618,378 A * | 2/1927 | Hatcher | ................ | B23B 31/307 269/21 |
| 2,895,739 A * | 7/1959 | Smith | .................. | B23B 31/307 279/3 |
| 3,618,432 A * | 11/1971 | Briese | .................. | B23B 31/307 82/117 |
| 3,833,230 A * | 9/1974 | Noll | ...................... | B23B 31/307 269/21 |
| 4,766,788 A * | 8/1988 | Yashiki | ................. | B23B 31/307 279/3 |
| 6,030,326 A * | 2/2000 | Azuma | ..................... | B27B 5/30 483/30 |
| 7,563,155 B2 * | 7/2009 | Kumagai | ................. | B27B 5/32 125/13.01 |
| 9,314,853 B2 * | 4/2016 | Wakita | ................... | B24B 45/00 |

FOREIGN PATENT DOCUMENTS

JP         2002-154054      5/2002

* cited by examiner

*Primary Examiner* — Eric A Gates
(74) *Attorney, Agent, or Firm* — Greer Burns & Crain Ltd.

(57) ABSTRACT

A mount flange for mounting a cutting blade on a spindle is provided. The cutting blade has a central engaging hole and a peripheral cutting edge. The mount flange includes a cylindrical boss portion having a front portion adapted to be inserted into the engaging hole of the cutting blade and a rear portion whose inner circumferential surface is adapted to be engaged with the spindle, and a flange portion projecting radially outward from the rear portion of the boss portion and having a front surface functioning as a mounting surface adapted to come into abutment against one side surface of the cutting blade. An annular space is formed in the mount flange so as to surround the spindle and open to the inner circumferential surface of the boss portion, thereby suppressing rearward warpage of the outer circumference of the flange portion due to the rotation of the spindle.

2 Claims, 4 Drawing Sheets

MOUNT FLANGE

BACKGROUND OF THE INVENTION

Field of the Invention

The present invention relates to a mount flange for mounting a cutting blade on a spindle as a rotating shaft.

Description of the Related Art

A cutting apparatus is used to process a platelike workpiece such as a semiconductor wafer and a resin substrate, wherein the cutting apparatus includes a spindle as a rotating shaft and a disk-shaped cutting blade mounted on the spindle. The cutting blade is mounted on the spindle through a mounting tool called mount flange. The cutting blade is replaced when it is worn to some extent.

Usually, the replacement of the cutting blade is manually performed by an operator. In performing this operation, various tools are used so as not to cause damage to various mechanisms, the mount flange, the cutting blade, etc. in the cutting apparatus. Accordingly, not only a skilled operator, but also some degree of operation time is required for the replacement of the cutting blade.

In contrast thereto, there has recently been proposed a mounting mechanism for fixing a cutting blade to a mount flange under suction by producing a vacuum in the vicinity of a mounting surface of the mount flange against which the cutting blade comes into abutment (see Japanese Patent Laid-open No. 2002-154054, for example). By using this mounting mechanism, the cutting blade can be replaced more simply in shorter time as compared with the prior art.

SUMMARY OF THE INVENTION

However, since a suction passage is formed in the above described mounting mechanism, the wall thickness of the mount flange must be increased as compared with the prior art. As a result, the weight balance of the mount flange is lost, causing a problem such that the outer circumference of a flange portion projecting radially outward may be warped rearward due to the rotation of the spindle.

It is therefore an object of the present invention to provide a mount flange which can suppress the deformation due to the rotation of the spindle.

In accordance with an aspect of the present invention, there is provided a mount flange for mounting a cutting blade on a spindle, the cutting blade having a central engaging hole and a peripheral cutting edge, the mount flange including a cylindrical boss portion having a front portion adapted to be inserted into the engaging hole of the cutting blade and a rear portion whose inner circumferential surface is adapted to be engaged with the spindle; and a flange portion projecting radially outward from the rear portion of the boss portion and having a front surface functioning as a mounting surface adapted to come into abutment against one side surface of the cutting blade; wherein an annular space is formed in the mount flange so as to surround the spindle and open to the inner circumferential surface of the boss portion, thereby suppressing rearward warpage of the outer circumference of the flange portion due to the rotation of the spindle.

Preferably, a first suction passage is formed in the spindle, and a second suction passage is formed in the mount flange so as to open to the front surface of the flange portion, the second suction passage being connected to the first suction passage when the mount flange is fixed to the spindle. Preferably, the cutting blade has a hub base having a central hole as the engaging hole, the cutting edge being fixed to an outer circumferential portion of the hub base.

As described above, the mount flange of the present invention has the annular space surrounding the spindle and opening to the inner circumferential surface of the boss portion. Accordingly, the weight balance of the mount flange can be achieved to thereby suppress rearward warpage of the flange portion due to the rotation of the spindle. In other words, it is possible to provide the mount flange which can suppress the deformation due to the rotation of the spindle according to the present invention.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
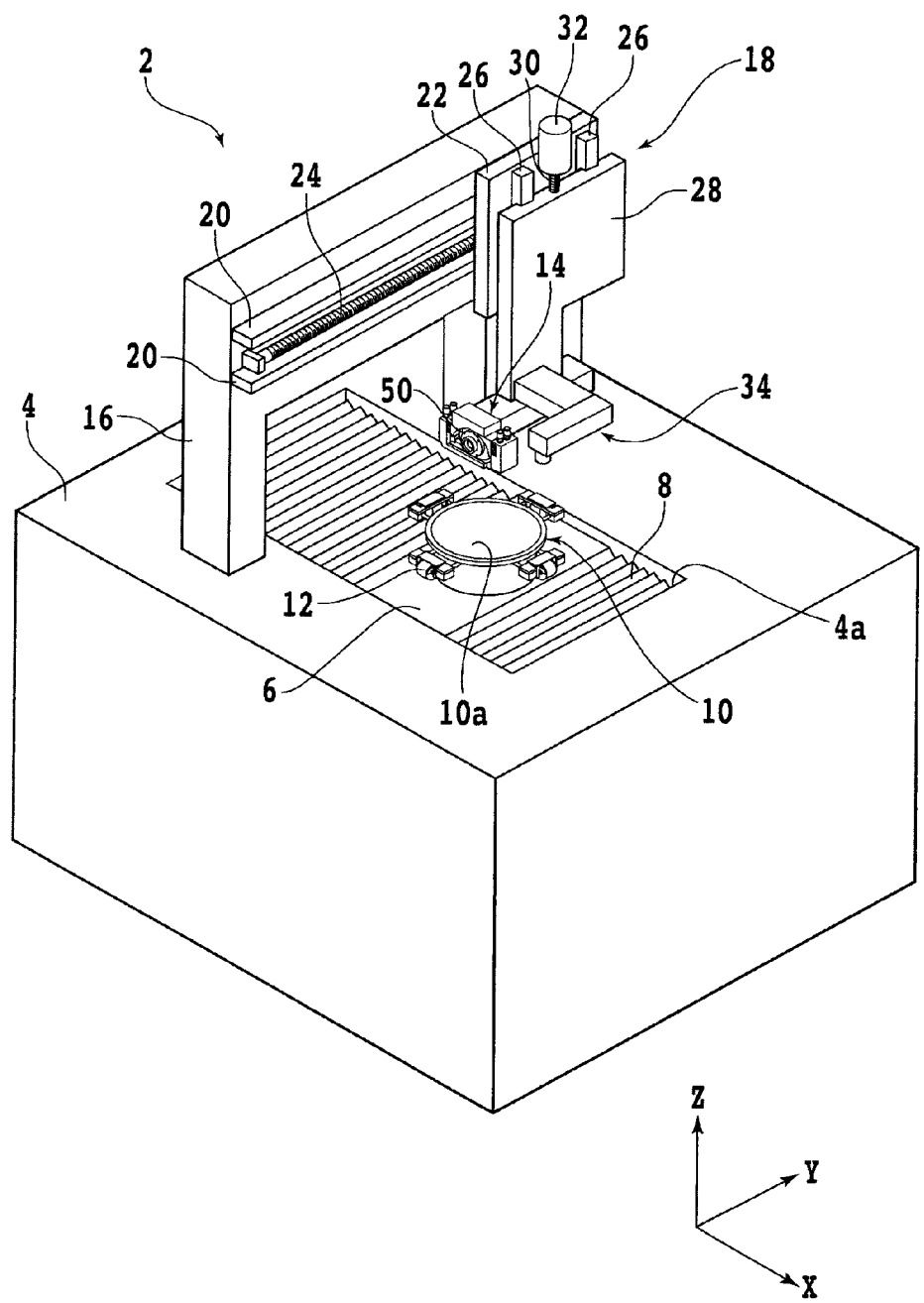
FIG. 1 is a schematic perspective view of a cutting apparatus using a mount flange according to a preferred embodiment of the present invention.

A preferred embodiment of the present invention will now be described with reference to the attached drawings. FIG. 1 is a schematic perspective view of a cutting apparatus 2 using a mount flange according to this preferred embodiment. As shown in FIG. 1, the cutting apparatus 2 includes a base 4 for supporting various structures. The base 4 has an upper surface, which is formed with a rectangular opening 4a elongated in the X axis direction (feeding direction). There are provided in this opening 4a an X axis moving table 6, an X axis moving mechanism (not shown) for moving the X axis moving table 6 in the X axis direction, and a drop-proof dust cover 8 for covering the X axis moving mechanism.

The X axis moving mechanism includes a pair of parallel X axis guide rails (not shown) extending in the X axis direction, and the X axis moving table 6 is slidably mounted on the X axis guide rails. A nut portion (not shown) is provided on the lower surface of the X axis moving table 6, and an X axis ball screw (not shown) extending parallel to the X axis guide rails is threadedly engaged with this nut portion of the X axis moving table 6. An X axis pulse motor (not shown) is connected to one end of the X axis ball screw. Accordingly, when the X axis pulse motor is operated to rotate the X axis ball screw, the X axis moving table 6 is moved along the X axis guide rails in the X axis direction.

A chuck table 10 for holding a platelike workpiece (not shown) such as a semiconductor wafer, resin substrate, and ceramic substrate under suction is provided on the upper surface of the X axis moving table 6. The chuck table 10 is connected to a rotational drive source (not shown) such as a motor, so that the chuck table 10 is rotatable by this rotational drive source so as to rotate about an axis extending in the Z direction (vertical direction). The chuck table 10 is also movable in the X axis direction by the X axis moving mechanism. The chuck table 10 has an upper surface as a holding surface 10a for holding the platelike workpiece under suction. The holding surface 10a of the chuck table 10 is connected to a vacuum source (not shown) through a suction passage (not shown) formed in the chuck table 10. A plurality of clamps 12 for clamping an annular frame (not shown) supporting the platelike workpiece are provided on the outer circumference of the chuck table 10, wherein the platelike workpiece is preliminarily supported to the annular frame.

A double column type support structure 16 for supporting a cutting unit 14 is provided on the upper surface of the base 4 so as to straddle the opening 4a. A cutting unit moving mechanism 18 for moving the cutting unit 14 in the Y axis direction (indexing direction) and the Z axis direction is provided on the front side of the support structure 16. The cutting unit moving mechanism 18 includes a pair of parallel Y axis guide rails 20 extending in the Y axis direction. The Y axis guide rails 20 are provided on the front surface of the support structure 16 at an upper portion thereof. A Y axis moving plate 22 constituting the cutting unit moving mechanism 18 is slidably mounted on the Y axis guide rails 20. A nut portion (not shown) is provided on the back side (rear surface) of the Y axis moving plate 22, and a Y axis ball screw 24 extending parallel to the Y axis guide rails 20 is threadedly engaged with this nut portion of the Y axis moving plate 22. A Y axis pulse motor (not shown) is connected to one end of the Y axis ball screw 24. Accordingly, when the Y axis pulse motor is operated to rotate the Y axis ball screw 24, the Y axis moving plate 22 is moved along the Y axis guide rails 20 in the Y axis direction.

A pair of parallel Z axis guide rails 26 extending in the Z axis direction are provided on the front surface of the Y axis moving plate 22. A Z axis moving plate 28 is slidably mounted on the Z axis guide rails 26. A nut portion (not shown) is provided on the back side (rear surface) of the Z axis moving plate 28, and a Z axis ball screw 30 extending parallel to the Z axis guide rails 26 is threadedly engaged with this nut portion of the Z axis moving plate 28. A Z axis pulse motor 32 is connected to one end of the Z axis ball screw 30. Accordingly, when the Z axis pulse motor 32 is operated to rotate the Z axis ball screw 30, the Z axis moving plate 28 is moved along the Z axis guide rails 26 in the Z axis direction.

The cutting unit 14 for cutting the platelike workpiece is provided on the Z axis moving plate 28 at a lower portion thereof. A camera 34 for imaging the front side (upper surface) of the platelike workpiece is also provided on the Z axis moving plate 28 at a position adjacent to the cutting unit 14. When the cutting unit moving mechanism 18 is operated to move the Y axis moving plate 22 and the Z axis moving plate 28 in the Y axis direction and the Z axis direction, respectively, the cutting unit 14 and the camera 34 are moved together in the Y axis direction and the Z axis direction.

Figure 2:
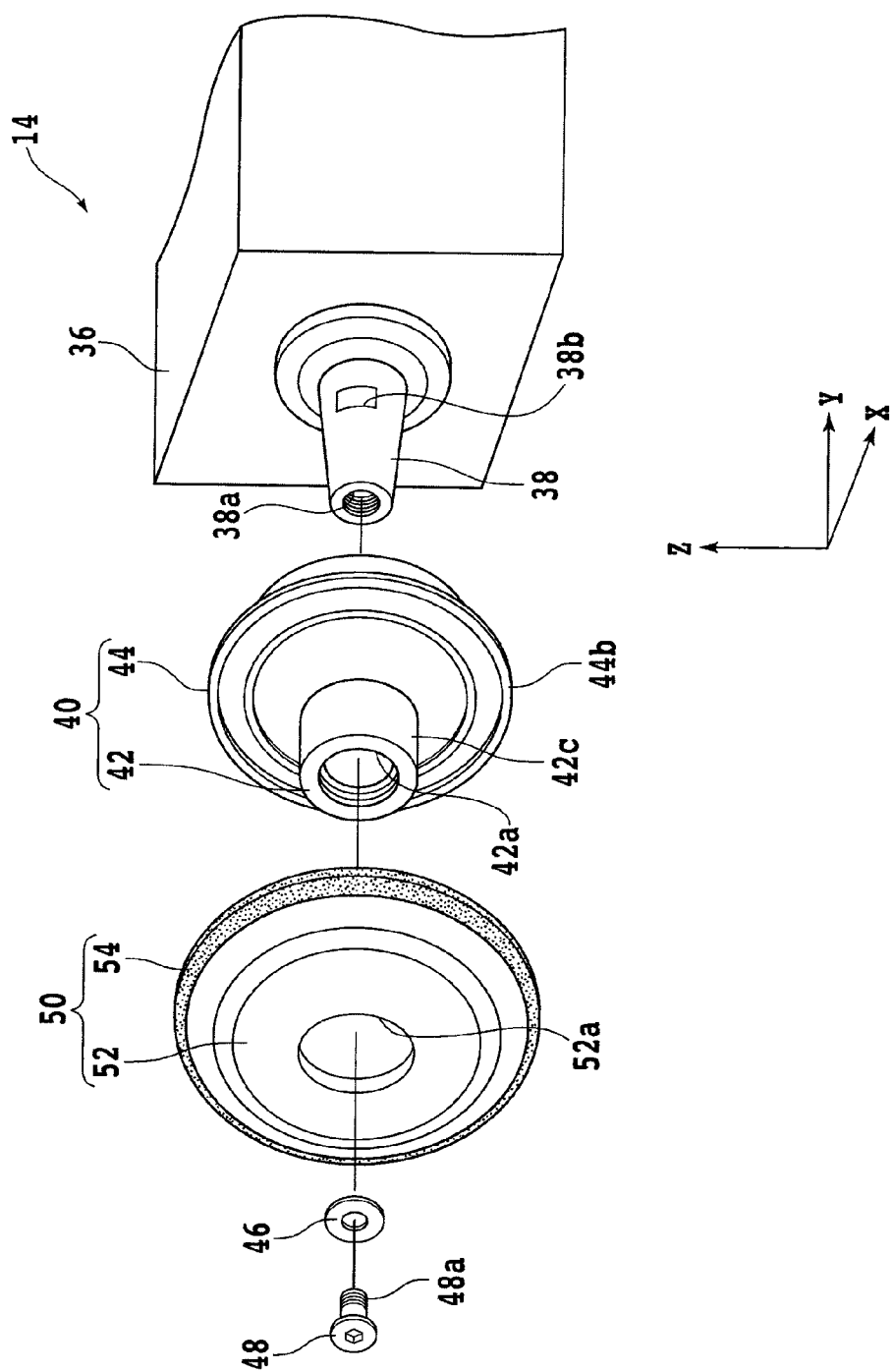
FIG. 2 is an exploded perspective view schematically showing the structure of a cutting unit.

FIG. 2 is an exploded perspective view schematically showing the structure of the cutting unit 14. As shown in FIG. 2, the cutting unit 14 includes a spindle housing 36 fixed to the lower portion of the Z axis moving plate 28. A spindle 38 is supported in the spindle housing 36 so as to be rotatable about the Y axis. The spindle 38 has a front end portion projecting from the spindle housing 36. The front end portion of the spindle 38 has a frustoconical shape such that the diameter of the front end portion is gradually decreased toward the front end surface thereof. The front end surface of the spindle 38 is formed with an opening (hole) 38a. The inner circumferential surface of the opening 38a is formed with an internal thread. A suction passage (first suction passage) 38b for transmitting a vacuum is formed in the spindle 38, and one end of the suction passage 38b opens to the outer circumferential surface of the front end portion of the spindle 38. The other end of the suction passage 38b is connected to a vacuum source (not shown) for generating a vacuum. A mount flange 40 is mounted on the front end portion of the spindle 38. A motor (not shown) for rotating the spindle 38 is connected to the rear end (base end) of the spindle 38.

The mount flange 40 includes a cylindrical boss portion 42 and a flange portion 44 projecting radially outward from the boss portion 42 at its rear portion. The boss portion 42 has an inner circumferential surface 42a, and the front end portion of the spindle 38 is engaged with the inner circumferential surface 42a at its rear portion. In the condition where the spindle 38 is engaged with the boss portion 42, a washer 46 is set inside the inner circumferential surface 42a of the boss portion 42, and a fixing bolt 48 is tightly engaged with the opening 38a of the spindle 38 through the washer 46, thereby fixing the mount flange 40 to the spindle 38. The bolt 48 has an outer circumferential surface 48a having an external thread corresponding to the internal thread of the opening 38a.

Figure 3:
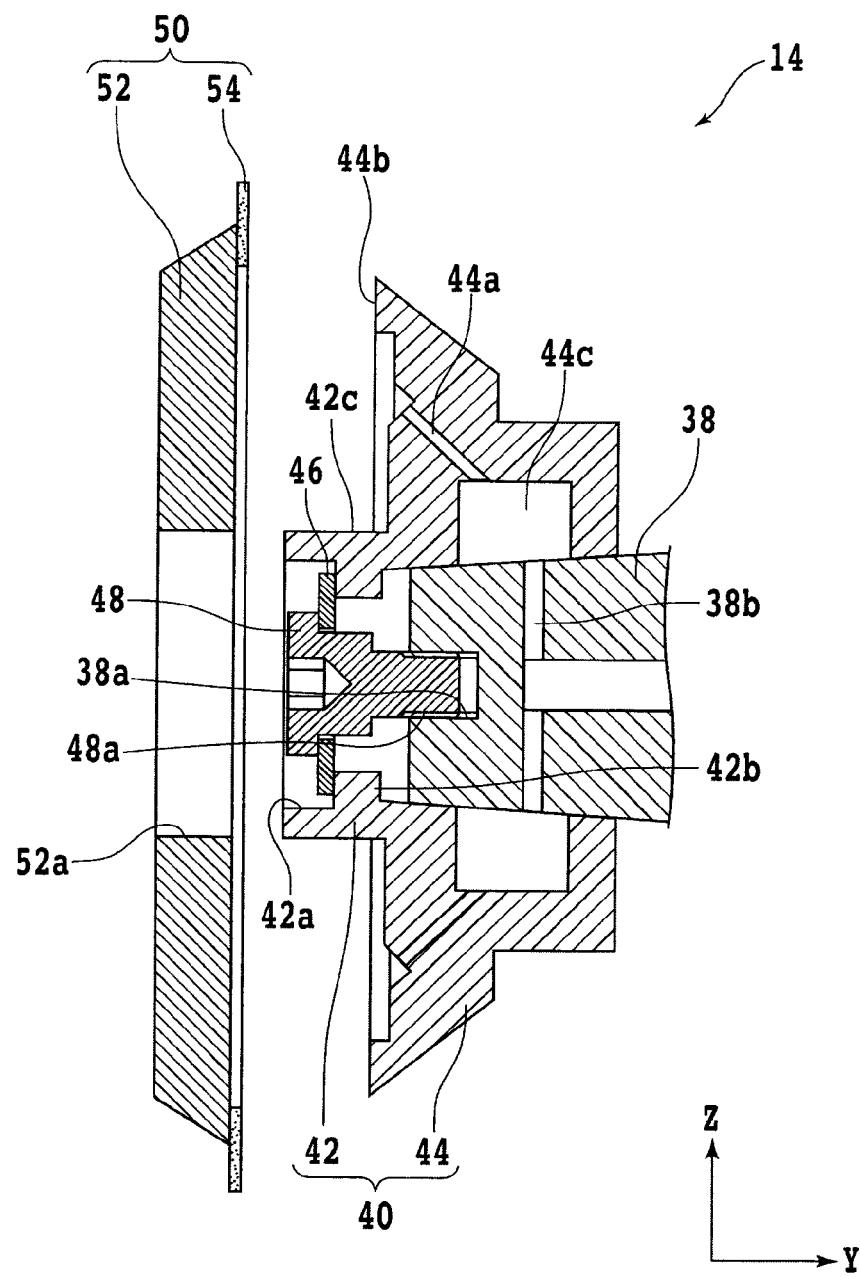
FIG. 3 is a schematic sectional view showing a condition where the mount flange is fixed to a spindle.

FIG. 3 is a sectional view schematically showing the condition that the mount flange 40 is fixed to the spindle 38. As shown in FIG. 3, the inner circumferential surface 42a of the boss portion 42 is formed with a support portion 42b for supporting the washer 46. A suction passage (second suction passage) 44a for transmitting a vacuum is formed in the flange portion 44. One end of the suction passage 44a opens to the front surface of the flange portion 44. When the mount flange 40 is fixed to the spindle 38, the suction passage 44a of the flange portion 44 is connected to the suction passage 38b of the spindle 38. Accordingly, the vacuum generated by the vacuum source can be applied to the front surface of the flange portion 44.

The flange portion 44 has a mounting surface 44b formed as an outer circumferential portion of the front surface of the flange portion 44. The mounting surface 44b is adapted to come into abutment against the rear surface (one side surface) of a cutting blade 50. This mounting surface 44b is annular as viewed in the Y axis direction (in the direction along the axis of the spindle 38). The cutting blade 50 is a so-called hub blade composed of a disk-shaped hub base 52 and an annular cutting edge 54 fixed to the outer circumferential portion of the hub base 52 for cutting the platelike workpiece. The cutting edge 54 has a predetermined thickness and it is formed by mixing abrasive grains of diamond, CBN (Cubic Boron Nitride), etc. in a bond material such as metal and resin.

Figure 4:
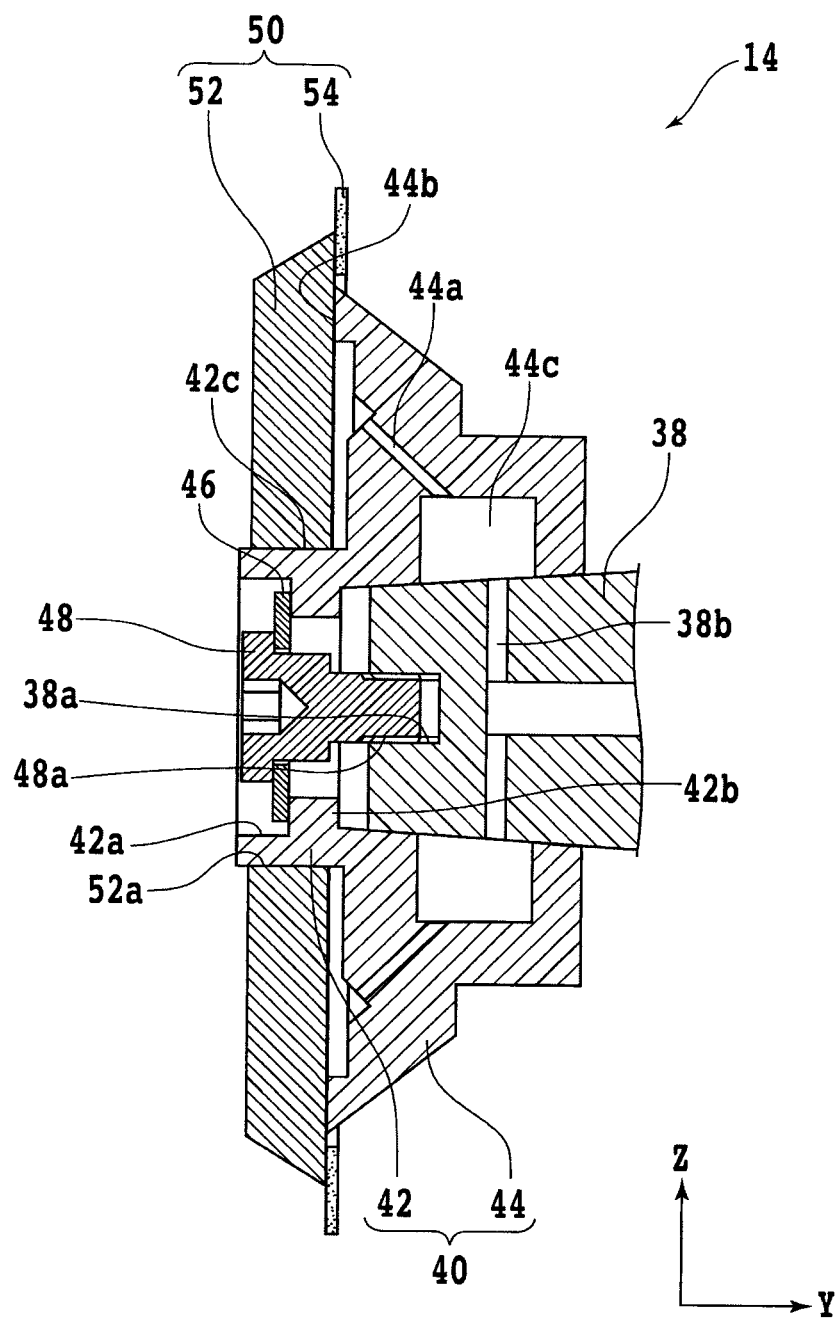
FIG. 4 is a schematic sectional view showing a condition where a cutting blade is mounted on the mount flange.

An engaging hole 52a having substantially the same diameter as the outer diameter of the boss portion 42 is formed at the central portion of the hub 52. The engaging hole 52a of the hub base 52 is engaged with the front portion of the boss portion 42, and the rear surface of the cutting blade 50 is brought into abutment against the mounting surface 44b of the flange portion 44. In this condition, the vacuum generated by the vacuum source is applied to the front surface of the flange portion 44, thereby mounting the cutting blade 50 on the mount flange 40 under suction. FIG. 4 is a sectional view schematically showing the condition that the cutting blade 50 is mounted on the mount flange 40. As shown in FIG. 4, the rear surface of the hub base 52 comes into abutment against the mounting surface 44b of the flange portion 44, and the engaging hole 52a (the inner circumferential surface) of the hub base 52 comes into contact with the outer circumferential surface 42c of the boss portion 42 in the condition where the cutting blade 50 is mounted on the mount flange 40.

In general, when a spindle in a cutting unit configured described above is rotated at high speeds, there is a possibility that the outer circumference of a flange portion of a mount flange in the cutting unit may be warped rearward. It is considered that this phenomenon may be due to an increase in wall thickness of the mount flange, causing a loss of weight balance or the like. To cope with this problem, the mount flange 40 in this preferred embodiment has an annular space 44c surrounding the spindle 38 and opening to the inner circumferential surface 42a of the boss portion 42. More specifically, the annular space 44c is formed in the boss portion 42 and the flange portion 44, so that the weight balance of the mount flange 40 can be achieved to thereby suppress rearward warpage of the flange portion 44 due to the rotation of the spindle 38. The volume, shape, etc. of the annular space 44c may be arbitrarily changed within the scope where the above effect can be attained.

As described above, the mount flange 40 according to this preferred embodiment has the annular space 44c surrounding the spindle 38 and opening to the inner circumferential surface 42a of the boss portion 42. Accordingly, the weight balance of the mount flange 40 can be achieved to thereby suppress rearward warpage of the flange portion 44 due to the rotation of the spindle 38. In other words, it is possible to provide the mount flange 40 which can suppress the deformation due to the rotation of the spindle 38 according to this preferred embodiment.

The present invention is not limited to the above preferred embodiment. For example, while the suction passage 38b is connected through the annular space 44c to the suction passage 44a in this preferred embodiment, the annular space 44c may be formed independently of the suction passage 38b and the suction passage 44a.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A mount flange for mounting a cutting blade on a spindle, said cutting blade having a central engaging hole and a peripheral cutting edge, said mount flange comprising:
    a cylindrical boss portion having a front portion adapted to be inserted into said engaging hole of said cutting blade and a rear portion whose inner circumferential surface is adapted to be engaged with said spindle; and
    a flange portion projecting radially outward from said rear portion of said boss portion and having a front surface functioning as a mounting surface adapted to come into abutment against one side surface of said cutting blade;
    wherein an annular space is formed in said mount flange at the rear portion of the cylindrical boss portion so as to surround said spindle, said annular space being enclosed on a side by a rear-most portion of the cylindrical boss portion, the annular space being open to the inner circumferential surface of said boss portion, thereby suppressing rearward warpage of an outer circumference of said flange portion due to the rotation of said spindle.

2. The mount flange according to claim 1, wherein a first suction passage is formed in said spindle, and a second suction passage is formed in said mount flange so as to be open to said front surface of said flange portion, said second suction passage being connected to said first suction passage when said mount flange is fixed to said spindle.

* * * * *